United States Patent [19]

Dehaas

[11] 4,135,968
[45] Jan. 23, 1979

[54] SPENT LIQUOR TREATMENT

[75] Inventor: Gerrit G. Dehaas, Longview, Wash.

[73] Assignee: Weyerhaeuser Company, Tacoma, Wash.

[21] Appl. No.: 764,307

[22] Filed: Jan. 31, 1977

Related U.S. Application Data

[63] Continuation-in-part of Ser. No. 645,972, Apr. 9, 1976, abandoned.

[51] Int. Cl.² .................. D21C 11/04; D21C 11/12
[52] U.S. Cl. ........................... 162/30 R; 48/209; 162/30 K; 201/2.5
[58] Field of Search .................. 201/2.5; 423/207; 162/30 R, 30 K; 48/209

[56] References Cited

U.S. PATENT DOCUMENTS

| | | | |
|---|---|---|---|
| 2,391,566 | 12/1945 | Goodell | 423/207 X |
| 2,495,248 | 1/1950 | Gagliardi et al. | 423/207 |
| 2,574,193 | 11/1951 | Savell | 162/30 K |
| 3,366,535 | 1/1968 | Cann | 162/30 K |
| 3,574,051 | 4/1971 | Shah | 162/30 R |
| 3,674,630 | 7/1972 | Copeland | 162/30 K |
| 3,711,593 | 1/1973 | Shick et al. | 162/30 R X |
| 3,862,909 | 1/1975 | Copeland | 162/30 R X |
| 4,011,129 | 3/1977 | Tomlinson | 162/30 K |

*Primary Examiner*—Morris O. Wolk
*Assistant Examiner*—Arnold Turk

[57] ABSTRACT

A process of significantly increasing the capacity of and decreasing the pollution from an existing recovery boiler. The spent liquor is concentrated to 55 to 65 weight % solids and divided into two portions. One portion, containing 10 to 65 weight % of the solids is pyrolyzed, reducing the original fuel value of that portion by 25 to 70%. The remaining carboniferous char and inorganic material is carried to the recovery furnace. The other portion, containing the remainder of the solids, is carried directly to the furnace. The two portions may be combined prior to entering the furnace. In the latter case, the solids content of the combined portion should not be greater than 80 weight %.

11 Claims, 1 Drawing Figure

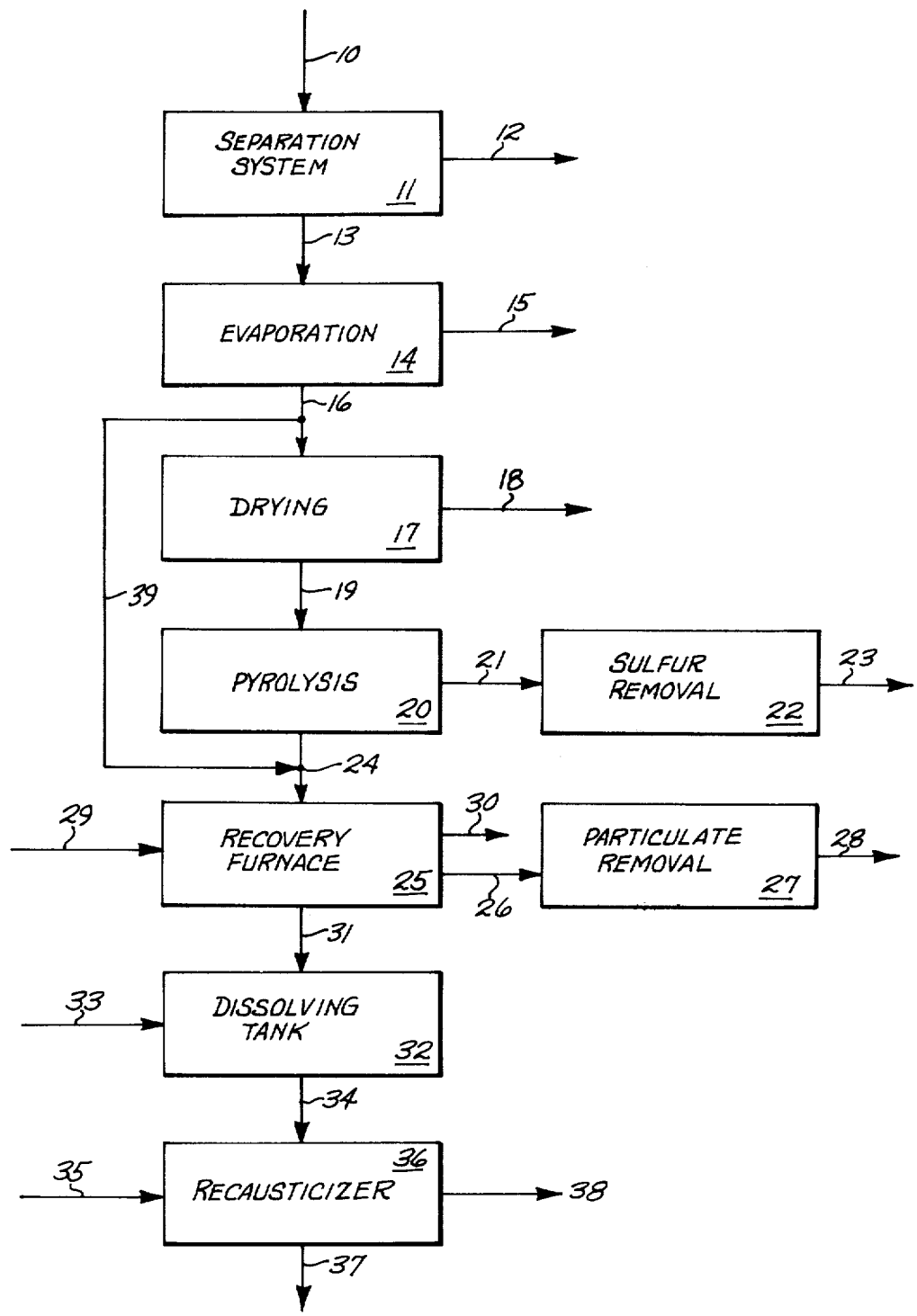

SPENT LIQUOR TREATMENT

RELATED CASES

This application contains subject matter common to and is a continuation-in-part of my copending application Ser. No. 645,972 filed Apr. 9, 1976 entitled "Spent Liquor Treatment", now abandoned.

BACKGROUND OF THE INVENTION

1. Field of the Invention

Recovery of heat, energy and chemicals from pulp mill liquor.

2. Description of the Prior Art

A number of patents disclose drying the spent liquor solids and burning the dried liquor solids in a recovery boiler. Exemplary are U.S. Pat. Nos. 1,779,768 and 2,406,581.

It has also been proposed to substitute a pyrolysis and gasification unit for a recovery boiler. Patents disclosing this arrangement are: Brink et al, U.S. Pat. Nos. 3,639,111, 3,718,446 and 3,761,568; and Holme, U.S. Pat. No. 3,867,251.

A number of patents disclose hydropyrolysis of spent liquor. This process yields a wet coke and an aqueous solution of inorganic chemicals. These are U.S. Pat. Nos. 3,558,426; 3,591,449; 3,595,742; 3,607,619; 3,705,077; 3,855,069; 3,884,751; and 3,762,989.

In a modern Kraft Pulp Mill, the chemical recovery boiler represents the single most expensive item of capital investment. Black liquor from pulping and brown stock washing is evaporated to 55–65% solids and sprayed into the boiler. Here it is burned to recover heat and pulping chemicals.

The organic materials in a typical kraft black liquor will normally comprise about 55% of the solid material present. The heating value of the dry solids will be approximately 6600 BTU/lb. Liquor, as ordinarily sprayed into the recovery boiler at 60–65% solids content, will have a net heating value about 3700 BTU/lb.

In this application, the terms recovery boiler, recovery furnace, chemical recovery boiler and recovery unit are used synonymously and refer to technology well established and understood in the pulping industry.

The ultimate capacity of a recovery unit, if undesirable particulate and gaseous emissions are not considered, is limited by the amount of heat transfer surface in the boiler section. About 10% of the heat value of a 65% solids liquor is lost as a result of the residual water. It has been proposed to increase the capacity of recovery boilers by this amount by the expedient of using wholly dried black liquor as a feed material. Experience has shown that overall thermal efficiency of the recovery boiler does increase. However, little or no added capacity is realized in terms of pounds of additional liquor solids that can be processed in a given unit of time.

In a conventionally operated recovery boiler, the concentrated black liquor is sprayed into an upper, oxidizing zone. Here the residual water is evaporated and a partial combustion of the organic materials occurs. Turbulence is high in this section of the furnace and it is here that there is a considerable entrainment of particulate matter into the flue gases. The partially burned material falls onto a bed on the hearth area of the furnace where a reducing atmosphere prevails. The bulk of the remaining organic materials is converted to carbon monoxide which is burned as it rises into the upper oxidizing zone. The conversion of the sodium sulfate in the black liquor back to sodium sulfide occurs in this bed. A blanket of partially burned liquor lying on the surface of the bed protects the system against reoxidation. The resulting inorganic residue is drawn off the bottom of the bed as a molten smelt and used for the makeup of cooking liquor.

An excellent treatment of the subject is found in the book "Chemical Recovery in Alkaline Pulping Processes," TAPPI Monograph No. 32 (1968) and there is no need to repeat all the details in this application.

There has always been some loss of inorganic materials in fine particulate form associated with the recovery boiler. Additionally, there have been malodorous gases formed from the sulfur-containing components of the liquor.

In the past, emissions of solids and of sulfur-containing gases have generally been of acceptable levels when the recovery boiler was operated at or below its design capacity. In the event of an expansion which added additional pulping capacity to the mill, it has usually been more acceptable to run the boiler in an overloaded condition than to replace it with a new boiler of larger capacity. Depending on the size of the mill, recovery boilers today cost approximately $20–30 million. Overloading the boiler tends to result in marked increases in the emission of particulate matter and the obnoxious sulfur-containing gases. In view of pollution regulations which are becoming increasingly stringent, it is no longer acceptable, either legally or socially, to run recovery boilers in this condition.

Obviously, because of the high cost, replacement of a recovery boiler is not a matter to be taken lightly. In a number of cases, particularly in older mills which may have been running at marginal profitability, the only reasonable alternative has been to close the mill. This, of course, has a serious and adverse financial impact on both the employees and the community in which the mill is located.

The dilemma between closing a mill or replacing the recovery boiler with one that will meet current and expected future pollution requirements has prompted a search for new recovery processes. The references cited in this application are all directed toward the solution of problems of this general type. It has been pointed out earlier that the use of wholly dried liquor as a feed to the recovery furnace is no answer to the mill with an overloaded boiler.

One possible alternative is in the early development stage and is as yet a long way from being ready to put into a full sized pulp mill. These are units typified by the previously mentioned patents to Brink, et al, in which the concentrated black liquor is subjected to a one or two stage pyrolysis-gasification process. Here the black liquor is typically pyrolyzed in a first zone to a char and a fuel gas. This char, which still contains most or all of the inorganic materials, then drops into an oxidizing zone where the carbon is burned off and the inorganic materials recovered. The process, as now conceived, is not well designed for kraft liquors since a very indirect route must be followed to regenerate the sodium sulfide from the sodium sulfate found in the black liquor. Equipment for this entire process is not presently available in the market place. Even if it were, it would still involve major capital expenditure because the existing chemical recovery boiler would be totally replaced.

The comments made above in regard to the proposed pyrolysis-gasification process apply equally to a second alternative which is based on hydropyrolysis of the spent liquor.

It is clear that none of the above processes deal with the question as to how a mill can make advantageous use of its in-place recovery boiler and still meet pollution standards without the expenditure of huge amounts of capital. It is to this end that the present invention is directed.

SUMMARY OF THE INVENTION

The present invention involves concentrating the spent liquor to 55 to 65 weight % solids. The concentrated effluent is divided into two portions and one portion of the concentrated liquor is pyrolyzed to create a carboniferous char which contains most or all of the inorganic chemicals originally present in that portion. In this process, approximately 25-70% of the BTU value of the organic materials in the spent liquor are taken off in the pyrolyzer as fuel gas. Pyrolysis equipment is now available in the marketplace of sufficient size and dependability for carrying out the process.

This char is then charged directly into an existing recovery boiler. The organics remaining in the char, which are primarily in the form of elemental carbon, are more than sufficient to maintain adequate combustion in the recovery furnace. In the case of kraft liquor the carbon will also be sufficient to provide the reducing conditions that are required in the hearth zone of the furnace to convert the sodium sulfate back to the active pulping material sodium sulfide. It is also possible to feed the char directly onto the smelt bed in the furnace.

The other portion of the concentrated effluent is carried directly to the recovery furnace. The two portions may be combined prior to the furnace. In this case, the total solids in the combined effluent should not exceed 80 weight %.

This use of a pyrolyzer and recovery boiler in series enables an increase in capacity of the boiler by about 50% in terms of total weight of black liquor solids processed. This effects a great reduction in the amount of particulate matter and odorous gases being carried away in the recovery furnace flue gas. It also improves boiler efficiency by reduction of tube fouling from entrained solids.

The fuel gas from the pyrolyzer can be directed to any of the many areas in a pulp mill where fossil fuels are now employed. It would also be suitable as fuel for a gas turbine for efficient generation of electrical power or can be used as fuel in the lime kiln or a conventional steam boiler.

One of the most important attributes of the system of this invention is its versatility. It can be used for any alkaline spent liquor, either kraft or soda, or with what will be broadly called neutral sulfite liquors which are typically used in the high yield pulping of corrugating medium and may be at a pH which will range from as low as pH 5.5 to well into the alkaline range. The process is also adaptable to mixtures of these liquors. In this application, these will all be considered as "alkaline liquors."

DESCRIPTION OF THE DRAWING

The drawing is a block diagram of the process of this invention.

DETAILED DESCRIPTION OF THE INVENTION

Pyrolysis of organic material is a process which has been carried out for several millenia in the manufacture of charcoal. The word, as used in this application, should be considered as synonymous with destructive distillation or thermal decomposition. Pyrolysis occurs in a hot environment in which there is a great stoichiometric deficiency of oxygen. This does not imply that oxygen must be totally absent. Most pyrolysis operations are carried out by internal heat generated by a limited and carefully controlled partial in situ combustion of the material being pyrolyzed. The products consist of a fuel gas and a char. The gas will have heating values dependent on the material being pyrolyzed and on the amount of inert materials such as carbon dioxide, water vapor and nitrogen that are present. The char will consist essentially of carbon with any inorganic products that were present in the starting material and not subject to volatilization or decomposition at the pyrolysis temperatures. It must be understood that the pyrolysis reaction seldom goes entirely to completion. There will thus be a variable percentage of chemically complex, partially pyrolyzed material present with the carbon.

Only a portion of the incoming black liquor stream is pyrolyzed. There are a number of reasons for this. As explained earlier, the entire point of the invention is to bring an overloaded recovery furnace back into control without major modification to the furnace itself.

Limiting factors are the amount of heat that can be removed in the boiler section and the amount of inorganic materials that can be handled on the smelt bed. Most furnaces do have some reserve capacity to handle additional smelt.

Another limitation will depend on the method of charging the liquor and char to the furnace. If they are to be simply mixed together and conventionally pumped to the existing black liquor nozzles, the solids content of the stream cannot exceed about 80%. Even when heated, the viscosity moves rapidly out of the pumpable range at higher concentrations. Typically, this condition would be encountered when portion of the incoming stream containing approximately 50% by weight of the solids content in the liquor was pyrolyzed to 55-60% of its original fuel value. This limitation does not apply, of course, if the two streams are charged separately. It may indeed be desirable in some instances to introduce the char as a separate stream at a lower level in the boiler, or even directly onto the smelt bed on the hearth. Normally when liquor is introduced separately from the char, or when the two are mixed, they will be injected into the usual location in the oxidizing zone of the furnace.

In order to be able to handle the inorganic salts, preferably no more than about 65% by weight of the incoming liquor solids should be pyrolyzed. The balance of the feed to the furnace would be conventionally concentrated black liquor at about 55% to 65% solids by weight. At the other end of the scale there is little advantage gained when less than 10% by weight of the incoming liquor solids are pyrolyzed. While the most preferred operating range will depend a great deal on the individual recovery furnace, in most cases it will fall between 20% and 55% by weight of the original black liquor solids being directed to the pyrolyzer. During pyrolysis it is preferred to take off between 30% and 70% of the original heat value of the organic materials as fuel gas.

Referring now to the drawing, the material 10 from the pulp digestion system enters the separation system 11 in which the pulp 12 is separated from the spent liquor 13. Spent liquor enters the evaporation system 14, normally multi-effect evaporation, in which water 15 is removed from the liquor and the solid content of the liquor is raised to between 40 and 65% by weight. The evaporators may be followed by a concentrator, not shown, as is typical in the industry, to raise the solids content to 55 to 65% by weight.

A portion of the concentrated liquor may enter a drying system 17 to remove additional water 18. A number of systems of drying known in the prior art are suitable for this step. Typical of these would be flash drying or spray drying. A modified spray drying system in which the liquor is atomized into superheated steam has been found to be quite effective. The saturated exhaust steam from this dryer may be used in numerous plant locations, such as the first effect of the evaporator.

The remainder of the concentrated waste liquor stream 39 goes directly to the recovery boiler 25.

The dried spent liquor 19, preferably about 90–100% solids, enters pyrolysis unit 20 in which some of the organic material in the liquor is converted to fuel gas 21. This gas may be sent through a sulfur removal unit 22 and the cleaned fuel gas 23 used for its energy values.

The residue 24 from the pyrolysis unit, containing both organic and inorganic material, enters a standard recovery boiler 25. If it is not combined with stream 39 but remains in a solid particulate form and not the usual liquid form, it may be introduced into the recovery boiler in a variety of locations. This could be either the oxidizing, transition or reducing zones. The char could also advantageously be introduced directly onto the smelt bed. In this way, it is possible for the material to enter the boiler in a zone of relatively lower temperature and gas velocity. There is thus less chance for the solids to become entrained as particulate matter or to be volatilized in the hotter oxidizing zone and carried out with the flue gas 26 into the boiler superheater section and out into the environment. The flue gas, however, does pass through an existing particulate removal system 27 before exiting to the atmosphere as clean gas 28. The heat generated in the recovery furnace is recovered by converting incoming water 29 to high pressure steam 30 in the boiler and superheater section of the furnace.

The inorganic material 31 from the recovery furnace enters dissolving tank 32 in which it is contacted with water 33 to form green liquor 34. The green liquor is contacted with burned lime 35 in recausticizer 36. Here the sodium carbonate is reconverted to sodium hydroxide. The recausticized liquor 37 is recycled as cooking liquor. Calcium carbonate 38, which forms during recausticization, is sent to the lime kiln for burning and reuse.

Several types of commercial pyrolyzers are available for use in the process. One type can be a slightly modified version of the fluidized bed combustion units now used for incineration of waste sulfite liquor. Such units are made by the Copeland Process Corporation or Dorr-Oliver Corporation. Descriptions are given in the "Proceedings on the Symposium on Recovery of Pulping Chemicals" (Helsinki May 13–17, 1968), Finnish Pulp and Paper Research Institute: 1969, 433–451. These are presently designed to accept a feed of concentrated liquor and process it through a complete combustion state. By limiting air flow, or by recycle of hot inert gases low in oxygen, these units will serve well as pyrolyzers. The fluidized bed pyrolyzers can utilize concentrated liquors of at least 65% solids content. It is preferred, however, to use a feed of black liquor dried to 90–100% solids in order to maintain optimum process control.

Another commercial unit suitable for the pyrolysis step is a multiple hearth furnace such as is made by the Envirotech Corporation.

A third unit is the TOSCOAL pyrolyzer, which uses recirculating heated ceramic balls as the heat source. This unit is described in *Chemical Engineering Progress:* 69, No. 3, p 50 (March, 1973).

Both of the latter pyrolyzers operate best on waste liquors that have been dried to the 90–100% solids range.

A fourth alternate, although this is not yet manufactured commercially, would be the pyrolysis section of the system shown by Brink et al in U.S. Pat. No. 3,639,111. This pyrolyzer was designed for use on conventionally concentrated liquor although it would work equally as well on dried liquor solids.

The individual plant situation will dictate whether pyrolysis must be only partial or must be essentially complete. Partial pyrolysis means that the thermal decomposition is not pressed all the way to a solid end product which is exclusively elemental carbon and inorganic materials. The extent of pyrolysis can probably best be defined in terms of how the heating value of the organic fraction is partitioned between the fuel gas and pyrolysis char fractions. For the present process to be used advantageously with an existing recovery furnace, at least 25% and preferably 30–70% of the original heating value of the black liquor solids should be converted into fuel gas. Conversely, the pyrolysis char should not retain more than 75% and preferably should retain about 70–30% of the original heating value of the dry black liquor solids. These values are calculated on the basis of a unit weight of dry liquor into the pyrolyzer and a pyrolyzed weight of solids out.

EXAMPLE 1

A kraft black liquor was evaporated and dried to essentially 100% solids content. Analysis showed it to contain 58% organic materials and 42% inorganic. The heating value was approximately 6500 BTU/lb. This was pyrolyzed to give 58 pounds of pyrolysis char with the balance being gaseous materials. The char consisted of 28% carbonaceous materials and 72% inorganic material with a fuel value of 4000 BTU/lb. The pyrolysis gas had a heat value of 350 BTU/cu ft. The cooled char was a granular material that could be easily mechanically or pneumatically transported to the recovery furnace.

EXAMPLE 2

The amount of the liquor stream to be pyrolyzed and the extent of pyrolysis necessary can be easily determined for any particular plant installation. As an example, a 1000 ton/day kraft mill pulping Douglas fir will send about 1750 tons/day of black liquor solids to the recovery boiler. This will yield about $2.27 \times 10^{10}$ BTU in the recovery boiler. If a 20% mill expansion to 1200 tons/day were proposed, this could be handled in the existing boiler only at a considerable sacrifice of thermal and chemical recovery efficiency. By pyrolyzing approximately 915 tons/day of liquor solids from a normal heat value of 6485 BTU/lb of dry solids to a residual heat value of about 4000 BTU per original pound charged, the boiler will not be subjected to thermal overload. Approximately $4 \times 10^9$ BTU/day would be available for other plant uses in the form of a fuel gas. This corresponds to a 38% reduction in the heating value of the original liquor and represents a heat load that will not be released in the recovery furnace.

What is claimed is:

1. The process of increasing the capacity of a recovery furnace for alkaline spent pulping liquor which contains both inorganic and organic material and from which chemical and energy values are recovered in said furnace, comprising:

concentrating said liquor to a solids content of between 55 and 65% by weight, dividing said liquor into two portions, one of said portions containing between 10 and 65% by weight of the total solids in said liquor and the other of said portions containing the remainder of said liquor solids, pyrolyzing said one portion of said liquor to convert part of its organic material to a fuel gas and the balance to a solid pyrolysis residue consisting of carboniferous char containing the inorganic material, and to reduce the original fuel value of said one portion of said liquor by 25 to 70% during said pyrolysis; and combusting said solid pyrolysis residue and said other portion of said liquor in said chemical recovery furnace to convert substantially all of said carboniferous char and said organic material to heat energy.

2. The process of claim 1 in which said one portion is concentrated to a solids content of between 90 and 100% by weight prior to pyrolysis.

3. The process of claim 1 in which said one portion contains between 20 and 55% by weight of the total solids in said liquor.

4. The process of claim 3 in which said spent liquor is selected from a group consisting of kraft liquor, soda liquor, neutral sulfite liquor, or a mixture thereof.

5. The process of claim 3 in which said one portion is concentrated to a solids content of between 90 and 100% by weight prior to pyrolysis.

6. The process of increasing the capacity of a recovery furnace for treating alkaline spent pulping liquor containing both organic and inorganic material and from which chemical and energy values are recovered in said furnace comprising:

concentrating said liquor to a solids content of between 55 and 65% by weight, dividing said liquor into two portions, one portion containing between 10 and 65% by weight of the total solids in said liquor and the other portion containing the remainder of said liquor solids, pyrolyzing said one portion of said liquor to convert part of its organic material to a fuel gas and the balance to a solid pyrolysis residue consisting of carboniferous char containing the inorganic material, and to reduce the original fuel value of said one portion of said liquor by 25 to 70% during said pyrolysis, and to provide a pyrolysis residue having a solids content which, when combined with said other liquor portion, will provide a combined liquor having a solids content no greater than about 80% by weight, combining said pyrolysis residue with said other portion of said liquor, and combusting said combined liquor in a chemical recovery furnace to convert substantially all of said carboniferous char and said organic material to heat energy.

7. The process of claim 6 in which said one portion is concentrated to a solids content of between 90 and 100% by weight prior to said pyrolysis.

8. The process of claim 6 in which said one portion contains between 20 and 55% by weight of the solids in said liquor.

9. The process of claim 8 in which said one portion is concentrated to a solids content of between 90 and 100% by weight prior to said pyrolysis.

10. The process of claim 8 in which said one portion contains approximately 50% by weight of the solids content in said liquor and the pyrolysis reduces the original fuel value of said one portion of said liquor to 55 to 60%.

11. The process of claim 6 in which said spent liquor is selected from a group consisting of kraft liquor, soda liquor, neutral sulfite liquor, or a mixture thereof.

* * * * *